US012754752B2

(12) United States Patent
De Kort et al.

(10) Patent No.: US 12,754,752 B2
(45) Date of Patent: Oct. 6, 2026

(54) VIRTUAL MACHINE LIVE MIGRATION WITH DIRECT-ATTACHED NON-VOLATILE MEMORY EXPRESS DEVICE

(71) Applicant: Microsoft Technology Licensing, LLC, Redmond, WA (US)

(72) Inventors: Martijn De Kort, Mill Creek, WA (US); Matthew David Kurjanowicz, Wenatchee, WA (US); Yuriy Pavlenko, Lake Forest, CA (US); Lei Kou, Redmond, WA (US); Sangeeth Kumar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 945 days.

(21) Appl. No.: 18/075,322

(22) Filed: Dec. 5, 2022

(65) Prior Publication Data

US 2024/0184612 A1 Jun. 6, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS 10,969,973 B2 4/2021 De Kort et al.
11,068,422 B1 * 7/2021 Tai ........................ G06F 9/4812
2013/0198312 A1 8/2013 Tamir et al.
(Continued)

FOREIGN PATENT DOCUMENTS

CN 109634771 A 4/2019
EP 3926471 A1 12/2021

OTHER PUBLICATIONS

NVM Express: NVM Express NVM Command Set Specification, Jul. 23, 2021, Revision 1.0a, NVM Express Workgroup, pp. 20-21 (Year: 2021).*

(Continued)

*Primary Examiner* — Bradley A Teets
*Assistant Examiner* — Melissa A Headly
(74) *Attorney, Agent, or Firm* — Workman Nydegger

(57) ABSTRACT

A device identifies a first entry, at a virtual submission queue, which includes a command identifier and an opcode. The device determines, based on the opcode, that a command is to be either: emulated by a virtual non-volatile memory express (NVMe) controller, or executed by a physical NVMe controller. The device inserts a second entry, into a physical controller submission queue, which includes the command identifier and either: the opcode (the physical execution determination), or a placeholder command opcode (the emulation determination). Later, the device identifies a third entry, at a physical controller completion queue, which includes the command identifier. Based on the command identifier, the device fetches the first entry from the virtual submission queue. The device inserts a fourth entry, into a virtual completion queue, which includes the command identifier and either: a result of emulating the command, or a result of the NVMe controller executing the command.

20 Claims, 4 Drawing Sheets

(56) References Cited

U.S. PATENT DOCUMENTS

| | | | | |
|---|---|---|---|---|
| 2013/0332660 | A1 | 12/2013 | Talagala et al. | |
| 2020/0174819 | A1* | 6/2020 | Dong | G06F 9/45558 |
| 2020/0333975 | A1* | 10/2020 | Benisty | G06F 3/0679 |
| 2021/0132860 | A1 | 5/2021 | Kou et al. | |
| 2021/0263762 | A1 | 8/2021 | Kachare et al. | |
| 2022/0004503 | A1 | 1/2022 | Mukherjee | |
| 2022/0129181 | A1 | 4/2022 | Morabad | |
| 2022/0147476 | A1* | 5/2022 | Nam | G06F 3/0647 |
| 2023/0070397 | A1* | 3/2023 | Esaka | G06F 3/0656 |
| 2023/0251799 | A1 | 8/2023 | Lee et al. | |

OTHER PUBLICATIONS

"Non Final Office Action Issued in U.S. Appl. No. 17/667,513", Mailed Date: Jul. 21, 2023, 11 Pages. (MS# 1 410876-US-NP).
"NVM Express NVM Command Set Specification", Retrieved from https://nvmexpress.org/wp-content/uploads/NVMe-NVM-Command-Set-Specification-1.0a-2021.07.26-Ratified.pdf, Jul. 23, 2021, pp. 1-105.
International Search Report and Written Opinion received for PCT Application No. PCT/US2023/036824, (MS #412055-PCT01) Mar. 1, 2024, 2024, 14 pages.
Notice of Allowance mailed on Dec. 11, 2023, in U.S. Appl. No. 17/667,513, (MS #410876-US01) 7 pages.
International preliminary report on patentability received for PCT Application No. PCT/US2023/036824, (MS #412055-PCT01) mailed on Jun. 19, 2025, 08 pages.
U.S. Appl. No. 17/667,513, filed Feb. 8, 2022.
"Solid State Storage", In Journal of Advancing Storage and Information Technology, Oct. 1, 2020, 101 Pages.
"TCG Storage Architecture Core Specification", Retrieved from: https://trustedcomputinggroup.org/wp-content/uploads/TCG_Storage_Architecture_Core_Spec_v2.01_r1.00.pdf, Aug. 5, 2015, 306 Pages.
"TCG Storage Feature Set: Block SID Authentication", Retrieved from: https://trustedcomputinggroup.org/wp-content/uploads/TCG_Storage-Feature_Set_Block_SID_Authentication_1-00_1-00.pdf, Aug. 5, 2015, 12 Pages.
"TCG Storage Interface Interactions Specification (SIIS)", Retrieved from: https://trustedcomputinggroup.org/wp-content/uploads/TCG_SWG_SIIS_v1.08_r1.00.pdf, Oct. 26, 2018, 58 Pages.
"TCG Storage Opal SSC Feature Set: Additional DataStore Tables", Retrieved from: https://web.archive.org/web/20210126214916/https://trustedcomputinggroup.org/resource/tcg-storage-opal-ssc-feature-set-additional-datastore-tables/, Jan. 26, 2021, 5 Pages.
"TCG Storage Opal SSC Feature Set: Configurable Locking for NVMe Namespaces and SCSI LUNs", Retrieved from: https://trustedcomputinggroup.org/wp-content/uploads/TCG_Storage_Configurable_Namespace_Locking-NS_and_LUN_v1p01_r1p11_31mar2021.pdf, Jan. 25, 2021, 50 Pages.
"TCG Storage Opal SSC Feature Set: Configurable Namespace Locking", Retrieved from: https://trustedcomputinggroup.org/wp-content/uploads/TCG_Storage-Opal_Feature_Set_CNL_v1_00_r1_00_pub.pdf, Feb. 22, 2019, 41 Pages.
"TCG Storage Opal SSC Feature Set: PSID", Retrieved from: https://trustedcomputinggroup.org/wp-content/uploads/TCG_Storage-Opal_Feature_Set_PSID_v1.00_r1.00.pdf, Aug. 5, 2015, 13 Pages.
"TCG Storage Opal SSC Feature Set: Single User Mode", Retrieved from: https://trustedcomputinggroup.org/wp-content/uploads/TCG_Storage-Opal_Feature_Set_Single_User_Mode_v1.00_r2.00.pdf, Aug. 5, 2015, 33 Pages.
"TCG Storage Protection Mechanisms for Secrets", Retrieved from: https://trustedcomputinggroup.org/wp-content/uploads/TCG_Storage_Protection_Mechanisms_for_Secrets_1-00_1-00_FINAL.pdf, Mar. 5, 2012, 7 Pages.
"TCG Storage Security Subsystem Class: Opal", Retrieved from: https://trustedcomputinggroup.org/wp-content/uploads/TCG_Storage-Opal_SSC_v2.01_rev1.00.pdf, Aug. 5, 2015, 80 Pages.
"International Search Report and Written Opinion Issued in PCT Application No. PCT/US22/050009", Mailed Date: Feb. 13, 2023, 12 Pages. (Ms# 410876-WO-PCT).
Communication pursuant to Article 94(3) received for European Application No. 22822769.0, (MS#410876-EP01-PCT) mailed on Mar. 25, 2026, 09 Pages.

* cited by examiner

VIRTUAL MACHINE LIVE MIGRATION WITH DIRECT-ATTACHED NON-VOLATILE MEMORY EXPRESS DEVICE

BACKGROUND

Hypervisor-based virtualization technologies allocate portions of a computer system's physical resources (e.g., processor cores and/or time, physical memory regions, storage resources, etc.) into separate partitions, and execute software within each of those partitions. Hypervisor-based virtualization technologies therefore facilitate creation of virtual machine (VM) guests that each executes guest software, such as an operating system (OS) and other software executing therein. A computer system that hosts VMs is commonly called a VM host or a VM host node. While hypervisor-based virtualization technologies can take a variety forms, many use an architecture comprising a hypervisor that has direct access to hardware and that operates in a separate execution environment than all other software in the system, a host partition that executes a host OS and host virtualization stack, and one or more guest partitions corresponding to VM guests. The host virtualization stack within the host partition manages guest partitions, and thus the hypervisor grants the host partition a greater level of access to the hypervisor, and to hardware resources, than it does to guest partitions.

VM host nodes are frequently arranged into clusters of related VM host nodes, such as failover clusters. In these cluster environments, a given VM guest can generally be hosted at any VM host node in the cluster, and can be migrated among VM host nodes in the cluster (e.g., due to a VM host node failure, due to VM host node maintenance or upgrades, due to load balancing). One form of VM guest migration is live migration, in which a host virtualization stack transfers VM guest state (e.g., CPU register state, memory state) from a source VM host node to a target VM host node, and then transfers execution of the VM guest to the target VM host node in a transparent manner (e.g., such that a VM guest OS and workload continues executing substantially uninterrupted).

VM guest storage is often backed by a file (or group of files) referred to as a virtual hard drive image. In these environments, live migration includes transferring this virtual hard drive image from a source VM host node to a target VM host node, or making the virtual hard drive image available to each of the source VM host node and the target VM host node via shared storage.

Many hypervisor-based virtualization technologies also support the direct assignment of a physical device to a VM guest. For example, using discrete device assignment (DDA) technology, the HYPER-V hypervisor from MICROSOFT CORPORATION enables an entire peripheral component interconnect express (PCIe) device to be passed to a VM guest. Direct assignment of physical devices allows high performance access to devices like non-volatile memory express (NVMe) storage devices, while enabling the VM guest to leverage the device's native drivers.

The NVMe specification defines an interface between a host computer and a storage device. This interface is based on use of paired submission and completion queues that are shared between an NVMe driver and an NVMe controller. Submission and completion queues are circular buffers, with fixed slot size, that are allocated from host memory that is accessible to the NVMe controller. The first entry of a queue is indicated by a head value, and the last entry of the queue is indicated by a tail value. Multiple submission queues can have a single completion queue. One submission and completion queue grouping is used as an administrative queue (e.g., for non-I/O operations), while additional submission and completion queue groupings are uses as data queues (e.g., on an input/output (I/O) path). To issue commands, the NVMe driver copies one or more submission queue entries (each specifying a command) into a submission queue, and then signals the NVMe controller about the presence of those entries by writing value to a "doorbell" register associated with that submission queue. This value indicates a new tail slot (e.g., last entry) of the submission queue, for example, based on a number of submission queue entries that were placed by the NVMe driver onto the submission queue. Based on the value written to the doorbell register, the NVMe controller reads one or more submission queue entries from the submission queue and completes each corresponding command (e.g., in the order received, in the order of priority). When the NVMe controller completes a given command, it copies a corresponding completion queue entry into a completion queue that is paired with the submission queue through which the command was submitted. The NVMe driver then obtains command completion state from the completion queue entries on the completion queue. When the NVMe driver has finished processing the completion entry, it writes to the corresponding completion queue's doorbell register, to let the NVMe controller know this completion entry slot can be re-used for future completions.

Some hypervisor-based virtualization technologies, such as HYPER-V, enable an NVMe controller to be directly assigned to a VM guest, based on mapping elements of the NVMe controller (e.g., a PCIe configuration space, a PCIe base address register) into a VM guest's memory space. These mappings enable the VM guest to interact with the NVMe controller using accesses (e.g., memory loads and memory stores) to its own guest memory space. Thus, these mappings enable the VM guest to interact with NVMe administrative queues, NVMe data queues, and NVMe doorbell registers via accesses to its own guest memory space. In some configurations, accesses by the VM guest to a guest memory page mapped to the NVMe doorbell registers are intercepted by a host OS, enabling the host virtualization stack at the host OS to filter which administrative commands and behaviors are available to the VM guest.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to methods, systems, and computer program products for processing NVMe administrative commands at a virtual NVMe controller using emulation. These aspects include: identifying a first submission queue entry at a virtual administrative submission queue of a NVMe controller, the first submission queue entry having been written by a VM guest to the virtual administrative submission queue, and including: a command identifier, and a first opcode of an administrative command; determining, based on the first opcode, that the administrative command is to be emulated by the virtual NVMe controller; inserting a second submission queue entry into a physical administrative submission queue of a physical NVMe controller, the second submission queue entry including: the command identifier, and a second opcode of a placeholder command that is different than the administrative command; identifying a first completion queue entry at a physical administrative completion queue of the physical NVMe controller, the first completion queue entry corresponding to the second submission queue entry and including the command identifier; and based on the first completion queue entry including the command identifier: fetching the first submission queue entry from the virtual administrative submission queue; based on the first submission queue entry, emulating the administrative command; and inserting a second completion queue entry into a virtual administrative completion queue of the virtual NVMe controller, the second completion queue entry including the command identifier and a result of emulating the administrative command.

In some aspects, the techniques described herein relate to methods, systems, and computer program products for processing NVMe administrative commands at a virtual NVMe controller using hardware acceleration. These aspects include: identifying a first submission queue entry at a virtual administrative submission queue of a virtual NVMe controller, the first submission queue entry having been written by a VM guest to the virtual administrative submission queue, and including: a command identifier, and an opcode of an administrative command; determining, based on the opcode, that the administrative command is to be executed by a physical NVMe controller; inserting a second submission queue entry into a physical administrative submission queue of the physical NVMe controller, the second submission queue entry including: the command identifier, and the opcode of the administrative command; identifying a first completion queue entry at a physical administrative completion queue of the physical NVMe controller, the first completion queue entry corresponding to the second submission queue entry and including: the command identifier, and a result of the physical NVMe controller having executed the administrative command; and based on the first completion queue entry including the command identifier: fetching the first submission queue entry from the virtual administrative submission queue; and inserting a second completion queue entry into a virtual administrative completion queue of the virtual NVMe controller, the second completion queue entry including: the command identifier, and the result of the physical NVMe controller having executed the administrative command.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Prior techniques to enable a non-volatile memory express (NVMe) controller to be directly assigned to a virtual machine (VM) guest presented significant challenges to live migration of that VM guest from one VM host node to another VM host node. This is because the VM guest had access to a physical NVMe controller's administrative queues. Even though commands written to those administrative queues may have been intercepted and filtered by a host virtualization stack (e.g., based on intercepting accesses to doorbell registers), those administrative queues still exposed physical properties of the NVMe controller to the VM guest. With this configuration, a VM guest could not be live migrated to another VM host node unless that target node had an identical NVMe controller (e.g., identical vendor identical model, and identical firmware), because the VM guest would be exposed to different properties of the new NVMe controller at the target VM host node.

The embodiments described herein overcome this challenge by providing a virtual NVMe controller at the host virtualization stack, and by exposing that virtual NVMe controller to a VM guest rather than exposing the underlying physical NVMe controller. This virtual NVMe controller inspects administrative commands submitted by a VM guest, and either emulates execution of the command (e.g., for commands that obtain state information), or relies on hardware-accelerated execution of the command by the underlying physical NVMe controller (e.g., for commands that create data queues). By providing virtual NVMe controllers at the host virtualization stacks of VM host nodes, a VM guest sees consistent NVMe controller properties regardless of which of those VM host nodes the VM guest is operated on, enabling the VM guest to be live migrated between different VM host nodes.

Additionally, prior techniques intercepted accesses by a VM guest to a guest memory page mapped to the NVMe doorbell registers. However, NVMe doorbell registers for both administrative queues and data queues reside on the same memory page, and interception of accesses to doorbell registers thus adversely affected the performance of data queue submissions. Embodiments described herein overcome this challenge by intercepting accesses by a VM guest to memory page(s) mapped to NVMe administrative queues, rather than intercepting accesses by the VM guest to a memory page mapped to NVMe doorbell registers. Embodiments described herein also map NVMe data queues into the VM guest's memory space. Mapping NVMe data queues into a VM guest's memory space, combined with intercepting accesses to NVMe administrative queues rather than access to NVMe doorbell registers, enables the VM guest unrestricted access to those NVMe data queues with native (or near-native) performance characteristics.

Figure 1:
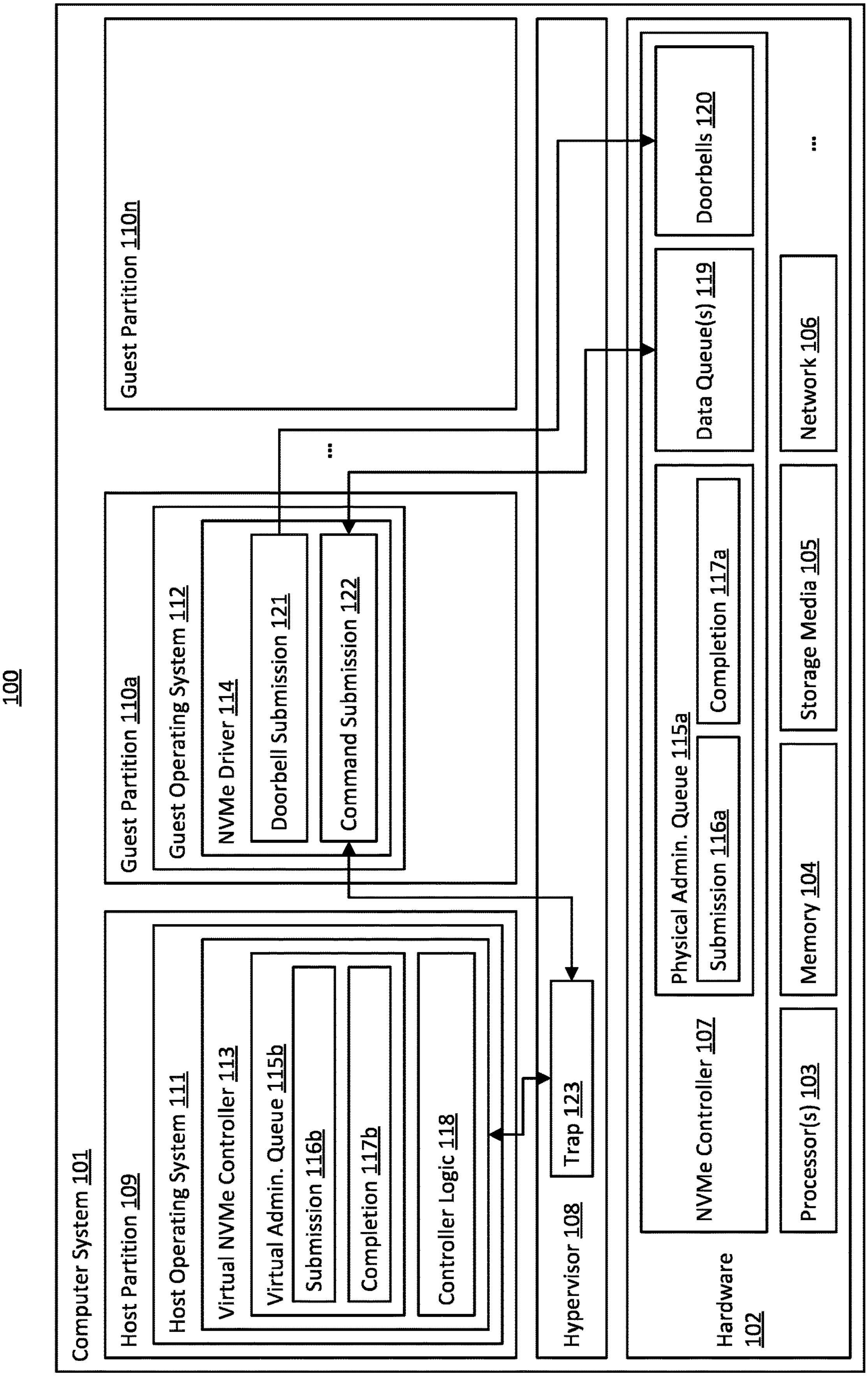
FIG. 1 illustrates an example computer architecture that facilitates VM live migration with a direct-attached NVMe device.

FIG. 1 illustrates an example computer architecture 100 that facilitates VM live migration with a direct-attached NVMe device. As shown, computer architecture 100 includes a computer system 101 comprising hardware 102. Examples of hardware 102 include a processing system comprising processor(s) 103 (e.g., a single processor, or a plurality of processors), memory 104 (e.g., system or main memory), a storage media 105 (e.g., a single computer-readable storage medium, or a plurality of computer-readable storage media), a network interface 106 (e.g., one or more network interface cards) for interconnecting to one or more other computer systems, and an NVMe controller 107 for interfacing with one or more storage media (e.g., storage media 105 or other storage). Although not shown, hardware 102 may also include other hardware devices, such as a trusted platform module (TPM) for facilitating measured boot features, a video display interface, a user input interface, an external bus, and the like.

As shown, in computer architecture 100, a hypervisor 108 executes directly on hardware 102. In general, hypervisor 108 partitions hardware resources (e.g., processor(s) 103, memory 104, I/O resources) among a host partition 109 within which a host operating system (OS) (host OS 111) executes, as well as one or more guest partitions (e.g., guest partition 110*a* to guest partition 110*n*). A guest OS executes within the context of each guest partition, such as guest OS 112 which executes within the context of guest partition 110*a*. In the description herein, the term "VM guest" is used to refer to a guest partition and the software executing therein. In embodiments, hypervisor 108 also enables regulated communications between partitions (e.g., to facilitate communications between the host partition and guest partitions) via a bus (e.g., a VM Bus, not shown).

Although not expressly illustrated, host OS 111 includes a host virtualization stack, which manages VM guests (e.g., memory management, VM guest lifecycle management, device virtualization) via one or more application program interface (API) calls to hypervisor 108. As mentioned, the embodiments described herein provide a virtual NVMe controller, and expose that virtual NVMe controller to VM guests, rather than exposing an underlying physical NVMe controller. Thus, in computer architecture 100, host OS 111 is shown as including a virtual NVMe controller 113 (e.g., as part of a host virtualization stack). In embodiments, virtual NVMe controller 113 communicates, via hypervisor 108, to an NVMe driver executing in one or more guest partitions (e.g., NVMe driver 114 executing in guest partition 110*a*).

In embodiments, virtual NVMe controller 113 inspects administrative commands submitted by a VM guest, and either emulates execution of the command, or relies on hardware-accelerated execution of the command by an underlying NVMe controller. For example, virtual NVMe controller 113 inspects an administrative command submitted by a command submission component 122 of NVMe driver 114, and either emulates that command, or forwards that command to NVMe controller 107 for execution. In embodiments, this inspection is accomplished based on virtual NVMe controller 113 creating a virtual administrative queue 115*b* (including a virtual submission queue 116*b* and a virtual completion queue 117*b*) on behalf of guest partition 110*a*. This virtual administrative queue 115*b* corresponds a physical administrative queue 115*a* (which includes a physical submission queue 116*a* and a physical completion queue 117*a*) of NVMe controller 107. Although physical administrative queue 115*a* is shown in connection with NVMe controller 107, that queue could reside in memory of NVMe controller 107 or in memory 104.

In embodiments, host OS 111 maps memory pages corresponding to virtual administrative queue 115*b* into guest memory of guest partition 110*a*, as memory pages backing an administrative submission queue used by command submission component 122. When command submission component 122 accesses (e.g., stores a submission queue entry to) virtual submission queue 116*b*, hypervisor 108 intercepts that access (as represented by trap 123, and arrows associated therewith), and forwards the intercepted access to virtual NVMe controller 113 for handling. This handling will be described in more detail in connection with FIGS. 2 and 4, with reference to controller logic 118 and method 400. By presenting virtual administrative queue 115*b*, and by handling submissions to that virtual administrative queue 115*b*, virtual NVMe controller 113 is able to provide a VM guest a consistent view of NVMe controller properties, regardless of which VM host node that VM guest is operated on, which enables the VM guest to be live migrated between different VM host nodes, even when the VM guest has been granted direct access to data queue(s) and doorbell registers at an NVMe controller.

In embodiments, host OS 111 also maps memory pages corresponding to data queue(s) 119 and doorbell registers (doorbells 120) into guest memory of guest partition 110*a*, but hypervisor 108 permits loads and stores associated with those memory pages to pass without interception (as indicated by an arrow between doorbell submission component 121 and doorbells 120, and an arrow between command submission component 122 and data queue(s) 119). This enables a doorbell submission component 121 and command submission component 122 at guest partition 110*a* to have unfettered access to data queue(s) 119 and doorbells 120, with native (or near-native) performance characteristics. Although data queue(s) 119 and doorbells 120 are shown in connection with NVMe controller 107, they could reside in memory of NVMe controller 107 or in memory 104.

Figure 2:
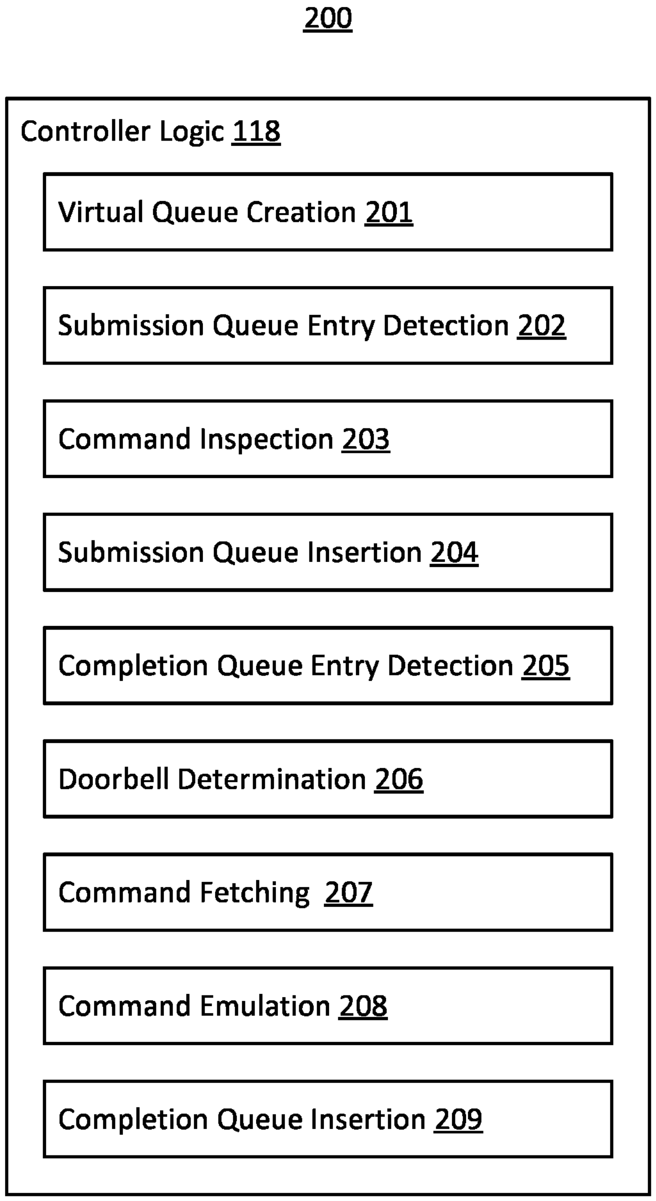
FIG. 2 illustrates an example of logic of a virtual NVMe controller.

FIG. 2 illustrates an example 200 of internal components of controller logic 118 of FIG. 1. Each internal component of controller logic 118 depicted in FIG. 2 represents various functionalities that controller logic 118 might implement in accordance with various embodiments described herein. It will be appreciated, however, that the depicted components—including their identity and arrangement—are presented merely as an aid in describing example embodiments of controller logic 118.

Initially, FIG. 2 illustrates controller logic 118 as including a virtual queue creation component 201. In embodiments, virtual queue creation component 201 creates a virtual administrative queue (e.g., virtual administrative queue 115*b*) for a corresponding physical administrative queue (e.g., physical administrative queue 115*a*). Although not illustrated, in some embodiments virtual queue creation component 201 also creates virtual data queues corresponding to physical data queues. This could, for example, enable virtual NVMe controller 113 to also intercept commands submitted to data queues.

FIG. 2 also illustrates controller logic 118 as including a submission queue entry detection 202. In embodiments, submission queue entry detection 202 detects the submission of a submission queue entry comprising an administrative command to virtual administrative queue 115*b* by guest partition 110*a*. In embodiments, this detection is based on hypervisor 108 having intercepted (e.g., trap 123) a write by guest partition 110*a* to guest memory mapped to virtual submission queue 116*b*.

FIG. 2 also illustrates controller logic 118 as including a command inspection component 203. In embodiments, command inspection component 203 inspects the submission queue entry detected by submission queue entry detection 202, and identifies an operation code (opcode) of an administrative command that is specified by the submission queue entry. In embodiments, command inspection component 203 also determines a command identifier that is specified by the submission queue entry.

Based on the determined opcode, command inspection component 203 determines if the requested administrative command can be emulated by virtual NVMe controller 113, or if the administrative command needs hardware acceleration (and, thus, execution by NVMe controller 107). Some embodiments emulate administrative commands that are informational in nature (e.g., to interact with NVMe controller state or properties), and rely on hardware acceleration for administrative commands that involve the creation or destruction of queues (e.g., to create or destroy a data queue). In embodiments, emulated administrative commands include one or more of IDENTIFY, GET LOG PAGE, SET FEATURES, or GET FEATURES. In embodiments, hardware accelerated administrative commands include one or more of CREATE I/O SUBMISSION QUEUE, CREATE I/O COMPLETION QUEUE, DELETE I/O SUBMISSION QUEUE, DELETE I/O COMPLETION QUEUE, ASYNCHRONOUS EVENT REQUEST, or ABORT. Some embodiments write an NVMe Error Status into a completion entry for an administrative command that is not supported by virtual NVMe controller 113. Some embodiments write an NVMe Success Status into a completion entry for an administrative command that does not change any internal state of virtual NVMe controller 113 because, for example, their implementation is a "no-op" (no operation). Examples of administrative commands that may not change any internal state of virtual NVMe controller 113 include NAMESPACE MANAGEMENT, FIRMWARE COMMIT, FIRMWARE IMAGE DOWNLOAD, DEVICE SELF-TEST, NAMESPACE ATTACHMENT, KEEP ALIVE, DIRECTIVE SEND, DIRECTIVE RECEIVE, VIRTUALIZATION MANAGEMENT, NVME-MI SEND, NVME-MI RECEIVE, and DOORBELL BUFFER CONFIG.

In embodiments, if command inspection component 203 determines that the administrative command can be emulated, then a submission queue insertion component 204 generates a new submission queue entry that specifies an opcode of a "placeholder" command, as well as the command identifier determined by command inspection component 203. In embodiments, submission queue insertion component 204 then inserts this new submission queue entry into physical submission queue 116*a*. In embodiments, the placeholder command is a command that is part of a command set of NVMe controller 107, but which executes with relatively low overheads (e.g., a low number of clock cycles) and without causing any harmful side-effects (e.g., such as to alter controller state or stored user data). In general, this can be a command that does not use any input or output buffers, and which can be completed quickly by the NVMe Controller without side-effects. To draw an analogy to processor instruction sets, in embodiments, the placeholder command is selected to be as close to a no-op command as is permitted by the command set of NVMe controller 107. In embodiments, the placeholder command is a GET FEATURES command, such as "GET FEATURES (Temperature Threshold)" or "GET FEATURES (Arbitration)".

Alternatively, in embodiments, if command inspection component 203 determines that the administrative command needs hardware acceleration, submission queue insertion component 204 inserts that command into physical submission queue 116*a*. In some embodiments, submission queue insertion component 204 copies the submission queue entry from virtual submission queue 116*b* to physical submission queue 116*a*. In other embodiments, submission queue insertion component 204 generates a new submission queue entry. Either way, in embodiments, this inserted submission queue entry includes the administrative command opcode and command identifier determined by command inspection component 203.

In either case (e.g., whether inserting a submission queue entry specifying a placeholder command or the original administrative command), in embodiments when inserting a submission queue entry into physical submission queue 116*a*, submission queue insertion component 204 inserts that submission queue entry into a slot that matches the command identifier included in the original submission queue entry detected by submission queue entry detection 202. This enables controller logic 118 to monitor a corresponding slot in physical completion queue 117*a* for completion of the inserted submission queue entry.

In embodiments, after submission queue insertion component 204 has inserted a submission queue entry into physical submission queue 116*a*, controller logic 118 returns from the intercept that triggered its operation. This means that a suspended virtual processor (VP) at guest partition 110*a* can resume execution. Guest partition 110*a* may submit one or more additional administrative commands to virtual administrative queue 115*b*, each of which are intercepted and handled in the manner described. Additionally, or alternatively, guest partition 110*a* may write to a doorbell register (e.g., within doorbells 120, using doorbell submission component 121) that is associated with physical administrative queue 115*a*, in order to trigger execution of a specified number of administrative commands from physical submission queue 116*a*.

Notably, it may take multiple write access from the NVMe driver 114 to the virtual submission queue 116*b* to insert a single submission queue entry into physical submission queue 116*a*. Thus, there will be an intercept for each of these writes. In embodiments, the command inspection component 203 inspects the command on each intercept (and, for example, updates a physical submission queue entry, determines if the command can be emulated or needs hardware acceleration, etc.), even if the command is only partially constructed.

After guest partition 110*a* has written to a doorbell register associated with physical administrative queue 115*a*, NVMe controller 107 executes commands from physical submission queue 116*a*, which includes the entries inserted into physical submission queue 116*a* by submission queue insertion component 204, and places completion queue entries in physical completion queue 117*a*.

FIG. 2 also illustrates controller logic 118 as including a completion queue entry detection component 205. In embodiments, completion queue entry detection component 205 monitors (e.g., by polling) physical completion queue 117*a* for new completion queue entries. In some embodiments, completion queue entry detection component 205 detects a new completion queue entry by detecting the toggling of a phase tag within a physical completion queue slot. In embodiments, when completion queue entry detection component 205 has detected a new completion queue entry, completion queue entry detection component 205 determines a command identifier contained in that completion queue entry, based on inspecting the entry itself, or based on which slot the new completion queue entry was present in.

FIG. 2 also illustrates controller logic 118 as including a doorbell determination component 206. In embodiments, doorbell determination component 206 determines which doorbell value was written by guest partition 110*a* to the doorbell register associated with physical administrative queue 115*a*, in order to trigger execution of the submission queue entries contained therein. In some embodiments, doorbell determination component 206 makes this determination based on identifying how many new completion queue entries have been detected within physical completion queue 117*a*. In other embodiments, doorbell determination component 206 makes this determination based on a slot number of a new completion queue entry within physical completion queue 117*a*.

FIG. 2 also illustrates controller logic 118 as including a command fetching component 207. In embodiments, command fetching component 207 fetches a submission queue entry from virtual submission queue 116*b*. In embodiments, command fetching component 207 fetches a number of submission queue entries equaling a doorbell value determined by doorbell determination component 206. In embodiments, when fetching these submission queue entries, command fetching component 207 fetches entries that were previously detected by submission queue entry detection 202.

In embodiments, for each submission queue entry fetched, command inspection component 203 inspects the entry to identify at least an administrative command opcode and a command identifier from the entry. In embodiments, the command inspection component 203 also determines (e.g., based on the opcode) if the administrative command can be emulated by virtual NVMe controller 113, or if the administrative command needed hardware acceleration.

If the administrative command can be emulated, then the command is emulated by command emulation component 208. Based on a result of this emulation, a completion queue insertion component 209 inserts, into virtual completion queue 117*b*, a completion queue entry comprising a result of command emulation by command emulation component 208. In embodiments, the corresponding completion queue entry, which contains the result of execution of a placeholder command, is removed or invalidated within physical completion queue 117*a*. In embodiments, this corresponding completion queue entry is identified based on command identifier or slot number.

If the administrative command needed hardware acceleration, then that command would have already been executed by NVMe controller 107. Thus, completion queue insertion component 209 inserts, into virtual completion queue 117*b*, a completion queue entry comprising a result obtained from a corresponding completion queue entry, which contains the result of execution the command by NVMe controller 107. In embodiments, this corresponding completion queue entry is identified based on command identifier or slot number. In embodiments, this corresponding completion queue entry is also removed or invalidated within physical completion queue 117*a*.

Accordingly, by emulating certain administrative commands with virtual NVMe controller 113, rather than passing those commands to NVMe controller 107, embodiments enable consistent NVMe controller properties to be presented to VM guests. This enables those VM guests to be live migrated from one VM host node to another. Additionally, these embodiments intercept writes to a virtual administrative queue, without intercepting writes to doorbell registers. Not intercepting doorbell register writes enables VM guests to interact with data queues with native (or near-native) performance characteristics.

Figure 3:
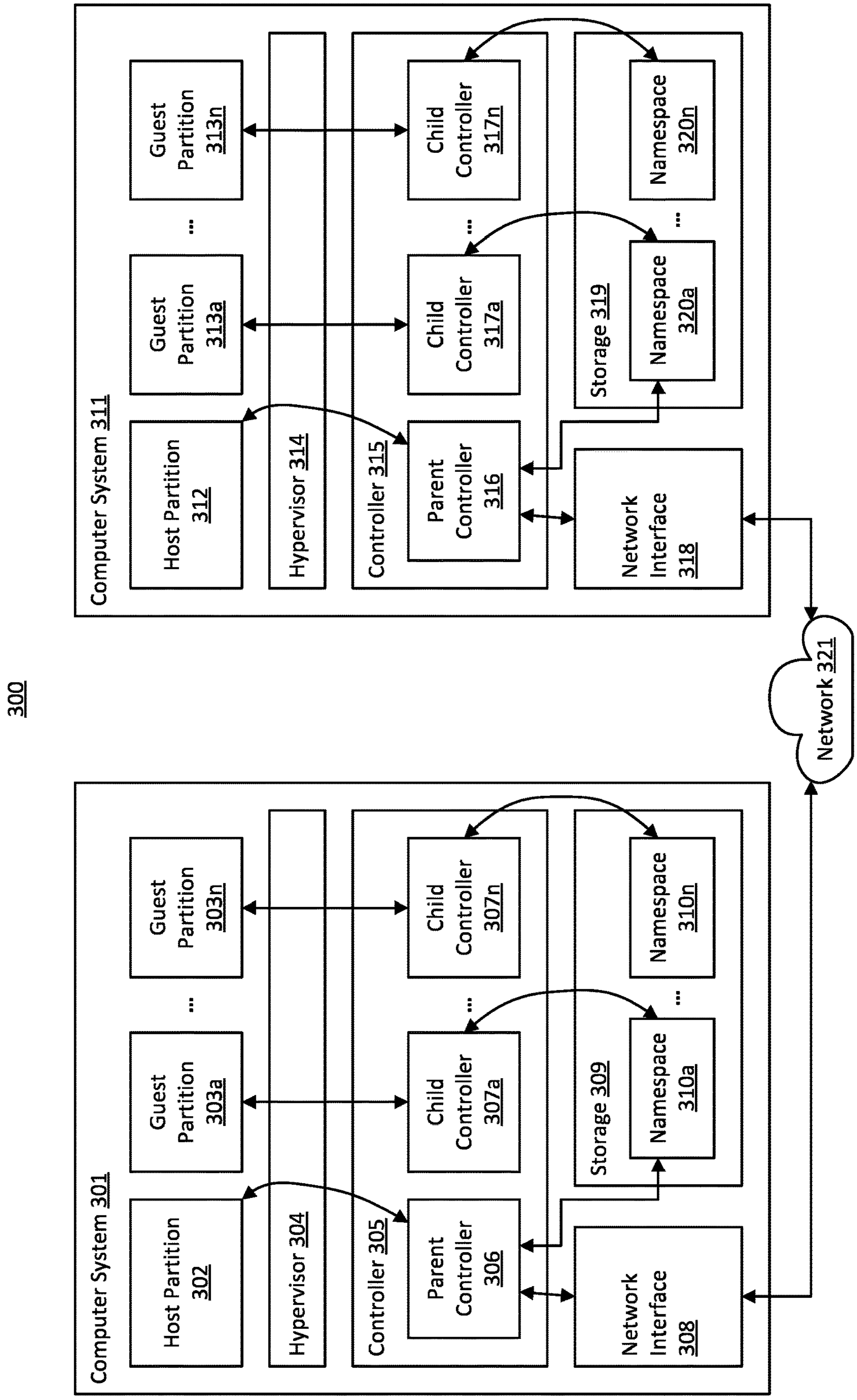
FIG. 3 illustrates an example of data transfer between NVMe devices at different VM host nodes.

In order to facilitate live VM guest migration, embodiments also facilitate data transfer from an NVMe device on one VM host node to an NVMe device on another VM host node. FIG. 3 illustrates an example 300 of data transfer between NVMe devices at a different VM host nodes. These embodiments utilize physical NVMe Devices that are capable of presenting a plurality of logical controllers, including a "parent" controller and a plurality of "child" controllers. In example 300, there are two VM host nodes, shown as computer system 301 and computer system 311, which are interconnected by a network 321. Each of these computer systems includes a corresponding hypervisor (e.g., hypervisor 304 at computer system 301 and hypervisor 314 at computer system 311) which each creates a host partition (e.g., host partition 302 at computer system 301 and host partition 312 at computer system 311) and one or more guest partitions (e.g., guest partition 303*a* to guest partition 303*n* at computer system 301, and guest partition 313*a* to guest partition 313*n* at computer system 311). Additionally, each of these computer systems includes a corresponding NVMe device (e.g., an NVMe device comprising controller 305 at computer system 301, and an NVMe device comprising controller 315 at computer system 311), a corresponding storage device (e.g., storage 309 at computer system 301 and storage 319 at computer system 311), and a corresponding network interface (e.g., network interface 308 at computer system 301 and network interface 318 at computer system 311).

Turning to the NVMe controllers, each of controller 305 and controller 315 are illustrated as including a corresponding parent controller (e.g., parent controller 306 at controller 305, and parent controller 316 at controller 315) and a plurality of corresponding child controllers (e.g., child controller 307*a* to child controller 307*n* at controller 305, and child controller 317*a* to child controller 317*n* at controller 315). As indicated by arrows, each parent controller is assigned to a corresponding host partition, and each child controller is assigned to a corresponding guest partition (VM guest). Each child controller stores data to a different namespace at a storage device. For example, child controller 307*a* stores data for guest partition 303*a* to namespace 310*a* at storage 309; child controller 307*n* stores data for guest partition 303*n* to namespace 310*n* at storage 309; child controller 317*a* stores data for guest partition 313*a* to namespace 321*a* at storage 319; and child controller 317*n* stores data for guest partition 313*n* to namespace 320*n* at storage 319.

In embodiments, a host partition may lack access to data stored on a guest partition's namespace. For example, host partition 302 may lack access to one or more of namespace 310*a* to namespace 310*n*, and host partition 312 may lack access to one or more of namespace 320*a* to namespace 320*n*. However, in embodiments, a parent controller may have access to the namespaces of its corresponding child controllers (e.g., parent controller 306 can access namespace 310*a* to namespace 310*n*, and parent controller 316 can access namespace 320*a* to namespace 320*n*). Thus, in embodiments, to facilitate data transfer during live migration of a VM guest, data transfer is facilitated by parent controllers (e.g., instead of host partitions). For example, as indicated by arrows, when the VM guest at guest partition 303*a* (computer system 301) is migrated to guest partition 313*a*, parent controller 306 reads data from namespace

310*a*, and transfers that data over network interface 308. At computer system 311, this data is received at network interface 318, and parent controller 316 transfers that data into namespace 320*a*.

Figure 4:
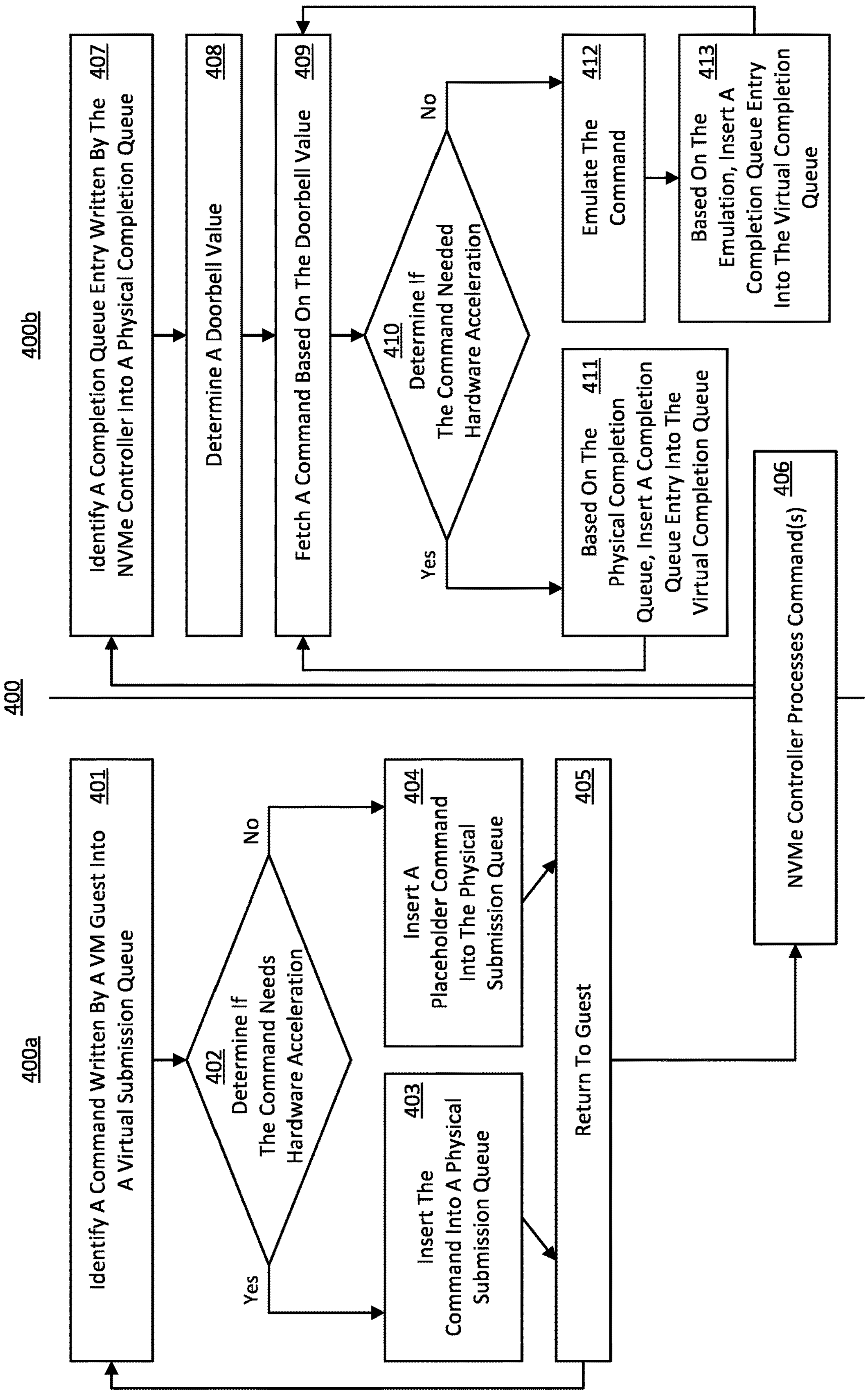
FIG. 4 illustrates a flow chart of an example method for processing NVMe administrative commands at a virtual NVMe controller, which enables live migration of a VM guest having a direct-attached NVMe device.

Operation of controller logic 118 is now described further in connection with FIG. 4, which illustrates a flow chart of an example method 400 for processing NVMe administrative commands at a virtual NVMe controller. In embodiments, method 400 enables live migration of a VM guest having a direct-attached NVMe device. In embodiments, instructions for implementing method 400 are encoded as computer-executable instructions (e.g., controller logic 118) stored on a computer storage media (e.g., storage media 105) that are executable by a processor (e.g., processor(s) 103) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 1, method 400 operates in computer architecture 100, in which virtual NVMe controller 113 operating at host OS 111 includes virtual administrative queue 115*b* (including virtual submission queue 116*b* and virtual completion queue 117*b*), which corresponds to physical administrative queue 115*a* of NVMe controller 107. In some embodiments, virtual NVMe controller 113 creates this virtual administrative queue 115*b*. Thus, in some embodiments, method 400 includes virtual queue creation component 201 creating a virtual administrative submission queue and a virtual administrative completion queue.

Referring to FIG. 4, in embodiments, method 400 includes a method 400*a* that occurs based on intercepting a write, from guest partition 110*a*, of a submission queue entry to virtual submission queue 116*b*. Thus, in embodiments, method 400*a* occurs while a VP associated with guest partition 110*a* that caused the intercept is suspended until return of the intercept. In method 400*a*, virtual NVMe controller 113 determines if an administrative command submitted by guest partition 110*a* can be emulated, or if it needs hardware acceleration, and writes an appropriate submission queue entry to physical submission queue 116*a*.

Method 400 also includes method 400*b* that occurs after guest partition 110*a* has written to a doorbell register corresponding to physical administrative queue 115*a*. In embodiments, method 400*b* occurs after guest partition 110*a* has been resumed following return of the intercept. In method 400*b*, virtual NVMe controller 113 either emulates execution of an administrative command specified in a submission queue entry of physical submission queue 116*a*, or utilizes a result of NVMe controller 107 having executed the administrative command.

Referring initially to method 400*a*, method 400*a* comprises an act 401 of identifying a command written by a VM guest into a virtual submission queue. In some embodiments, act 401 comprises identifying a submission queue entry at a virtual administrative submission queue of a virtual NVMe controller, the submission queue entry having been written by a VM guest to the virtual administrative submission queue, and including (1) a command identifier, and (2) an opcode of an administrative command. In an example, submission queue entry detection 202 detects insertion, by command submission component 122, of a submission queue entry into virtual submission queue 116*b*. This submission queue entry includes at least an opcode of an administrative command, and a command identifier, as specified by command submission component 122.

As discussed, in embodiments, submission queue entry detection 202 operates based on hypervisor 108 having intercepted a write by guest partition 110*a* to guest memory mapped to virtual submission queue 116*b*. Thus, in some embodiments of act 401, identifying the submission queue entry at the virtual administrative submission queue is based on intercepting a write by the VM guest to guest memory that is mapped to the virtual administrative submission queue.

Method 400*a* also comprises an act 402 of determining if the command needs hardware acceleration. In some embodiments, act 402 comprises determining, based on the opcode, either that the administrative command is to be executed by a physical NVMe controller (e.g., a "Yes" result of act 402, in which the administrative command needs hardware acceleration), or that the administrative command is to be emulated by the virtual NVMe controller (e.g., a "No" result of act 402, in which the administrative command does not need hardware acceleration). In an example, command inspection component 203 determines if the requested administrative command can be emulated by virtual NVMe controller 113, or if the administrative command needs hardware acceleration (and, thus, execution by NVMe controller 107). As discussed, in embodiments, administrative commands can be emulated if they are informational in nature (e.g., to interact with NVMe controller state or properties), and administrative commands may need hardware acceleration if they involve the creation or deletion of queues (e.g., to create or delete a data queue).

Following the "Yes" path from act 402, when the administrative command needs hardware acceleration, method 400*a* comprises an act 403 of inserting the command into a physical submission queue. In some embodiments, act 403 comprises inserting a submission queue entry into a physical administrative submission queue of the physical NVMe controller, the submission queue entry including (1) the command identifier, and (2) the opcode of the administrative command. In an example, submission queue insertion component 204 inserts a submission queue entry into physical submission queue 116*a*. This submission queue entry includes the same administrative command opcode and command identifier as the submission queue entry detected in act 401.

In some embodiments, act 403 comprises generating a new submission queue entry. Thus, in some embodiments, inserting the submission queue entry into the physical administrative submission queue comprises generating a new submission queue entry. In other embodiments, act 403 comprises copying the identified submission queue entry from virtual submission queue 116*b* to physical submission queue 116*a*. Thus, in other embodiments, inserting the submission queue entry into the physical administrative submission queue comprises inserting a copy of the submission queue entry identified in act 401 into the physical administrative submission queue.

As discussed, in some embodiments, when inserting a submission queue entry into physical submission queue 116*a*, submission queue insertion component 204 inserts that submission queue entry into a slot that matches the command identifier included in the submission queue entry obtained from virtual submission queue 116*b*. Thus, in some embodiments of act 403, inserting the submission queue entry into the physical administrative submission queue comprises inserting the submission queue entry into a slot of the physical administrative submission queue that corresponds to the command identifier.

Alternatively, following the "No" path from act 402, when the administrative command does not need hardware acceleration, method 400*a* comprises an act 404 of inserting a placeholder command into the physical submission queue. In some embodiments, act 404 comprises inserting a submission queue entry into a physical administrative submission queue of a physical NVMe controller, the submission queue entry including (1) the command identifier, and (2) an opcode of a placeholder command that is different than the administrative command. In an example, submission queue insertion component 204 inserts a submission queue entry into physical submission queue 116*a*. This submission queue entry includes an opcode of a placeholder command, and the same command identifier as the submission queue entry detected in act 401. In embodiments, the placeholder command is a command that is part of the command set of NVMe controller 107, but which executes with relatively low overheads (e.g., a low number of clock cycles) and without causing any harmful side-effects (e.g., such as to alter controller state or stored user data).

As discussed, in some embodiments, when inserting a submission queue entry into physical submission queue 116*a*, submission queue insertion component 204 inserts that submission queue entry into a slot that matches the command identifier included in the submission queue entry. Thus, in some embodiments of act 404, inserting the submission queue entry into the physical administrative submission queue comprises inserting the submission queue entry into a slot of the physical administrative submission queue that corresponds to the command identifier.

Method 400*a* also comprises an act 405 of returning to the guest. As mentioned, in embodiments, identifying the submission queue entry at the virtual administrative submission queue in act 401 is based on intercepting a write by a VP associated with guest partition 110*a*. In embodiments, handling of this exception by controller logic 118 ends after completion of act 403 or act 404. Thus, in embodiments, execution flow returns to guest partition 110*a*.

Notably, after act 405, method 400*a* can repeat any number of times, as indicated by an arrow extending from act 405 to act 401, based on guest partition 110*a* inserting one or more additional commands into virtual submission queue 116*b*.

Eventually, guest partition 110*a* may write to a doorbell register (doorbells 120) corresponding to virtual administrative queue 115*b*. Based on guest partition 110*a* writing to this doorbell register, in act 406 NVMe controller 107 processes one or more command(s) from physical submission queue 116*a* (e.g., command(s) inserted by submission queue insertion component 204 into physical submission queue 116*a* in act 403 and/or act 404), and inserts results of execution of those command(s) into physical completion queue 117*a* as completion queue entries. Notably, if act 404 was previously performed, then NVMe controller 107 executes a placeholder command, without causing any harmful side-effects (e.g., such as to alter controller state or stored user data). This, in some embodiments, the physical NVMe controller executes a placeholder command without causing a controller state or stored user data side-effect.

Turning to method 400*b*, method 400*b* includes an act 407 of identifying a completion queue entry written by the NVMe controller into a physical completion queue. In some embodiments, act 407 comprises identifying a completion queue entry at a physical administrative completion queue of the physical NVMe controller, the completion queue entry corresponding to the submission queue entry and including the command identifier. In an example, the completion queue entry detection component 205 monitors physical completion queue 117*a* for a new completion queue entry. In embodiments, this new completion queue entry comprises a result of the physical NVMe controller having executed an administrative command (e.g., based on that administrative command having been inserted into physical submission queue 116*a* in act 403), or a result of the physical NVMe controller having executed a placeholder command (e.g., based on that placeholder command having been inserted into physical submission queue 116*a* in act 404).

As mentioned, in embodiments, completion queue entry detection component 205 monitors physical completion queue 117*a* based on polling. Thus, in embodiments, identifying the completion queue entry at the physical administrative completion queue is based on polling the physical administrative completion queue. As also mentioned, in embodiments, completion queue entry detection component 205 detects a new completion queue entry by detecting the toggling of a phase tag (e.g., a zero or a one). Thus, in embodiments, identifying the completion queue entry at the physical administrative completion queue is based on determining that a phase tag of the completion queue entry has been toggled.

Method 400*b* also includes an act 408 of determining a doorbell value. In an example, doorbell determination component 206 determines which doorbell value was written by guest partition 110*a* to the doorbell register associated with physical administrative queue 115*a*, in order to trigger execution of the submission queue entries contained therein. Act 408 can include identifying how many new completion queue entries have been detected within physical completion queue 117*a*, determining a slot number of a new completion queue entry within physical completion queue 117*a*, etc. Thus, for example, in some embodiments act 408 comprises determining, based on the command identifier of the completion queue entry, a doorbell value that was written by the VM guest to a doorbell register corresponding to the physical administrative submission queue.

Method 400*b* also includes an act 409 of fetching a command based on the doorbell value. In some embodiments, act 409 comprises, based on the completion queue entry including the command identifier, fetching the submission queue entry from the virtual administrative submission queue. In embodiments, fetching the submission queue entry from the virtual administrative submission queue comprise fetching one or more submission queue entries from the virtual administrative submission queue based on the doorbell value. In an example, command fetching component 207 fetches a submission queue entry from virtual submission queue 116*b*. In embodiments, command fetching component 207 fetches a number of submission queue entries equaling a doorbell value determined by doorbell determination component 206 in act 408, and proceeds to act 410 for each of those fetched entries.

Method 400*b* also includes an act 410 of determining if the command needed hardware acceleration. In some embodiments, act 410 comprises, based on fetching the submission queue entry from the virtual administrative submission queue, identifying the opcode of the administrative command. In embodiments, act 410 also comprises determining, based on the opcode, either that the administrative command has been executed by the physical NVMe controller (e.g., a "Yes" result of act 410, in which the administrative command needed hardware acceleration), or that the administrative command is to be emulated by the virtual NVMe controller (e.g., a "No" result of act 410, in which the administrative command did not need hardware acceleration). In an example, command inspection component 203 determines if the requested administrative command can be emulated by virtual NVMe controller 113, or if the administrative command needs hardware acceleration (and, thus, was executed by NVMe controller 107).

Following the "Yes" path from act 410, when the administrative command needed hardware acceleration, method 400*b* comprises an act 411 of, based on the physical completion queue, inserting a completion queue entry into the virtual completion queue. In some embodiments, act 411 comprises inserting a completion queue entry into a virtual administrative completion queue of the virtual NVMe controller, the completion queue entry including (1) the command identifier, and (2) the result of the physical NVMe controller having executed the administrative command. In an example, because the administrative command needed hardware acceleration, that command would have already been executed by NVMe controller 107 (e.g., based on operation of method 400*a*). Thus, completion queue insertion component 209 inserts, into virtual completion queue 117*b*, a completion queue entry comprising a result obtained from a corresponding completion queue entry (which contains the result of execution the command by NVMe controller 107).

Alternatively, following the "No" path from act 410, when the administrative command did not need hardware acceleration, method 400*b* comprises an act 412 of emulating the command. In some embodiments, act 412 comprises, based on the submission queue entry, emulating the administrative command. In an example, because the administrative command can be emulated, then command emulation component 208 emulates the administrative command, producing a result.

Additionally, continuing the "No" path from act 410, method 400*b* also comprises an act 413 of, based on the emulation, inserting a completion queue entry into the virtual completion queue. In some embodiments, act 413 comprises inserting a completion queue entry into a virtual administrative completion queue of the virtual NVMe controller, the completion queue entry including the command identifier and a result of emulating the administrative command. In an example, based on a result of the emulation of act 412, completion queue insertion component 209 inserts, into virtual completion queue 117*b*, a completion queue entry comprising a result of command emulation by command emulation component 208.

Arrows extending from act 411 and act 413 to act 409 indicate that that method 400*b* case repeat (beginning at act 409) to process additional completion queue entries from physical completion queue 117*a*.

Embodiments of the disclosure may comprise or utilize a special-purpose or general-purpose computer system (e.g., computer system 101) that includes hardware 102, such as, for example, a processor system (e.g., processor(s) 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor, comprising:

identifying a first submission queue entry at a virtual administrative submission queue of a virtual non-volatile memory express (NVMe) controller, the first submission queue entry having been written by a virtual machine (VM) guest to the virtual administrative submission queue, and including: a command identifier, and a first opcode of an administrative command;

determining, based on the first opcode, that the administrative command is to be emulated by the virtual NVMe controller;

inserting a second submission queue entry into a physical administrative submission queue of a physical NVMe controller, the second submission queue entry including: the command identifier, and a second opcode of a placeholder command that is different than the first opcode of the administrative command;

identifying a first completion queue entry at a physical administrative completion queue of the physical NVMe controller, the first completion queue entry corresponding to the second submission queue entry and including the command identifier;

responsive to identifying the first completion queue entry:

identifying, based on the command identifier, a corresponding first submission queue entry from among a plurality of submission queue entries in the virtual administrative submission queue;

fetching the first submission queue entry from the virtual administrative submission queue based on the identifying; and emulating the administrative command based on the first submission queue entry fetched from the virtual administrative submission queue; and inserting a second completion queue entry into a virtual administrative completion queue of the virtual NVMe controller, the second completion queue entry including the command identifier and a result of emulating the administrative command.

2. The method of claim 1, further comprising:

identifying the first opcode of the administrative command; and determining, based on the first opcode, that the administrative command is to be emulated by the virtual NVMe controller.

3. The method of claim 1, further comprising creating the virtual administrative submission queue and the virtual administrative completion queue.

4. The method of claim 1, wherein inserting the second submission queue entry into the physical administrative submission queue comprises inserting the second submission queue entry into a slot of the physical administrative submission queue that corresponds to the command identifier.

5. The method of claim 1, wherein identifying the first submission queue entry at the virtual administrative submission queue is based on intercepting a write by the VM guest to guest memory that is mapped to the virtual administrative submission queue.

6. The method of claim 1, wherein fetching the first submission queue entry from the virtual administrative submission queue comprises:

determining, based on the command identifier, a doorbell value that was written by the VM guest to a doorbell register corresponding to the physical administrative submission queue; and fetching one or more submission queue entries from the virtual administrative submission queue based on the doorbell value.

7. The method of claim 1, wherein identifying the first completion queue entry at the physical administrative completion queue is based on polling the physical administrative completion queue.

8. The method of claim 1, wherein identifying the first completion queue entry at the physical administrative completion queue is based on determining that a phase tag of the first completion queue entry has been toggled.

9. The method of claim 1, wherein the physical NVMe controller executes the placeholder command without causing a controller state or stored user data side-effect.

10. A computer system comprising:

a processor system; and a computer storage medium that stores computer-executable instructions that are executable by the processor system to at least:

identify a first submission queue entry at a virtual administrative submission queue of a virtual non-volatile memory express (NVMe) controller, the first submission queue entry having been written by a virtual machine (VM) guest to the virtual administrative submission queue, and including: a command identifier, and a first opcode of an administrative command;

determine, based on the first opcode, that the administrative command is to be emulated by a virtual NVMe controller;

insert a second submission queue entry into a physical administrative submission queue of a physical NVMe controller, the second submission queue entry including: the command identifier, and a second opcode of a placeholder command that is different from the first opcode of the administrative command;

identify a first completion queue entry at a physical administrative completion queue of the physical NVMe controller, the first completion queue entry corresponding to the second submission queue entry and including: the command identifier;

responsive to identifying the first completion queue entry at the physical administrative completion queue:

identify, based on the command identifier, a corresponding first submission queue entry in the virtual administrative submission queue;

fetch the first submission queue entry from the virtual administrative submission queue based on the identifying; and emulate the administrative command based on the first submission queue entry fetched from the virtual administrative submission queue; and insert a second completion queue entry into a virtual administrative completion queue of the virtual NVMe controller, the second completion queue entry including: the command identifier, and a result of emulating the administrative command.

11. The computer system of claim 10, wherein the computer-executable instructions are also executable by the processor system to create the virtual administrative submission queue and the virtual administrative completion queue.

12. The computer system of claim 10, wherein inserting the second submission queue entry into the physical administrative submission queue comprises inserting the second submission queue entry into a slot of the physical administrative submission queue that corresponds to the command identifier.

13. The computer system of claim 10, wherein identifying the first submission queue entry at the virtual administrative submission queue is based on intercepting a write by the VM guest to guest memory that is mapped to the virtual administrative submission queue.

14. The computer system of claim 10, wherein fetching the first submission queue entry from the virtual administrative submission queue comprises:

determining, based on the command identifier, a doorbell value that was written by the VM guest to a doorbell register corresponding to the physical administrative submission queue; and fetching one or more submission queue entries from the virtual administrative submission queue based on the doorbell value.

15. The computer system of claim 10, wherein identifying the first completion queue entry at the physical administrative completion queue is based on polling the physical administrative completion queue.

16. The computer system of claim 10, wherein identifying the first completion queue entry at the physical administrative completion queue is based on determining that a phase tag of the first completion queue entry has been toggled.

17. The computer system of claim 10, wherein inserting the second submission queue entry into the physical administrative submission queue comprises inserting a copy of the first submission queue entry into the physical administrative submission queue.

18. A non-transitory computer-readable storage medium that stores computer-executable instructions that are executable by a processor system to at least:

identify a first submission queue entry at a virtual administrative submission queue of a virtual non-volatile memory express (NVMe) controller, the first submission queue entry having been written by a virtual machine (VM) guest to the virtual administrative submission queue, and including: a command identifier, and an opcode of an administrative command;

insert a second submission queue entry into a physical administrative submission queue of a physical NVMe controller, the second submission queue entry including the command identifier;

identify a first completion queue entry at a physical administrative completion queue of the physical NVMe controller, the first completion queue entry corresponding to the second submission queue entry and including the command identifier; and responsive to identifying the first completion queue entry in the physical administrative completion queue, and further responsive to the first completion queue entry including the command identifier:

identify, based on the command identifier, a corresponding first submission queue entry in the virtual administrative submission queue;

fetch the first submission queue entry from the virtual administrative submission queue based on the identifying;

determine, based on the opcode of the first submission queue entry fetched from the virtual administrative submission queue that the administrative command is to be emulated by the virtual NVMe controller;

emulate the administrative command based on the first submission queue entry fetched from the virtual administrative submission queue; and insert a second completion queue entry into a virtual administrative completion queue of the virtual NVMe controller, the second completion queue entry including the command identifier and a result that is based on emulating the administrative command by the virtual NVMe controller.

19. The non-transitory computer-readable storage medium of claim 18, wherein fetching the first submission queue entry from the virtual administrative submission queue comprises:

determining, based on the command identifier of the first completion queue entry, a doorbell value that was written by the VM guest to a doorbell register corresponding to the physical administrative submission queue; and fetching one or more submission queue entries from the virtual administrative submission queue based on the doorbell value.

20. The non-transitory computer-readable storage medium of claim 18, wherein the computer-executable instructions are also executable by the processor system to create the virtual administrative submission queue and the virtual administrative completion queue.

* * * * *